United States Patent
Dickinson

(10) Patent No.: US 11,671,365 B2
(45) Date of Patent: Jun. 6, 2023

(54) ASSOCIATING ROUTE TABLES WITH INGRESS TRAFFIC TO LOGICALLY ISOLATED NETWORKS

(71) Applicant: Amazon Technologies, Inc., Seattle, WA (US)

(72) Inventor: Andrew Bruce Dickinson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 61 days.

(21) Appl. No.: 17/093,315

(22) Filed: Nov. 9, 2020

(65) Prior Publication Data

US 2021/0135991 A1   May 6, 2021

Related U.S. Application Data

(63) Continuation of application No. 16/220,703, filed on Dec. 14, 2018, now Pat. No. 10,833,992.

(51) Int. Cl.
| | |
|---|---|
| H04L 12/745 | (2013.01) |
| H04L 12/741 | (2013.01) |
| H04L 12/725 | (2013.01) |
| H04L 12/46 | (2006.01) |
| H04L 12/713 | (2013.01) |
| H04L 12/931 | (2013.01) |

(Continued)

(52) U.S. Cl.
CPC ........ *H04L 45/748* (2013.01); *H04L 12/4633* (2013.01); *H04L 12/4641* (2013.01); *H04L 45/306* (2013.01); *H04L 45/38* (2013.01); *H04L 45/54* (2013.01); *H04L 45/586* (2013.01); *H04L 49/354* (2013.01)

(58) Field of Classification Search
CPC ..... H04L 45/748; H04L 45/306; H04L 45/38; H04L 45/54; H04L 45/586; H04L 12/4633; H04L 12/4641; H04L 49/354
See application file for complete search history.

(56) References Cited

U.S. PATENT DOCUMENTS

| | | |
|---|---|---|
| 8,369,333 B2 | 2/2013 | Hao et al. |
| 9,014,191 B1 | 4/2015 | Mandal et al. |

(Continued)

OTHER PUBLICATIONS

Zhangwei He et al., 'Improve Reliability of Scalable VPN Routing Via Relaying', Proceedings of IC-NIDC2010, 2010, pp. 1-6. (Year: 2010).*

(Continued)

*Primary Examiner* — Melvin C Marcelo
(74) *Attorney, Agent, or Firm* — S. Scott Foster; Kowert, Hood, Munyon, Rankin & Goetzel, P.C.

(57) ABSTRACT

Route tables may be associated with ingress traffic for logically isolated networks. A routing device at the edge of a logically isolated network may receive a route to include in a route table that is associated with ingress traffic to the logically isolated network to forward the ingress traffic to a network appliance hosted in the logically isolated network. Network packets received at the edge routing device may have a destination of a computing resource hosted in the logically isolated network. The edge routing device may identify the route in the route table to override the destination in the network packet with the network appliance and forward the network packet to the network appliance according to the route.

20 Claims, 8 Drawing Sheets

(51) Int. Cl.
*H04L 12/721* (2013.01)
*H04L 45/748* (2022.01)
*H04L 45/00* (2022.01)
*H04L 45/302* (2022.01)
*H04L 45/586* (2022.01)
*H04L 49/354* (2022.01)

(56) References Cited

U.S. PATENT DOCUMENTS

| | | |
|---|---|---|
| 9,124,536 B2 | 9/2015 | DeCusatis et al. |
| 9,906,401 B1 | 2/2018 | Rao |
| 10,833,992 B1 | 11/2020 | Dickinson |
| 2016/0087940 A1 | 3/2016 | Miller et al. |
| 2020/0169534 A1 | 5/2020 | Fritz et al. |

OTHER PUBLICATIONS

U.S. Appl. No. 17/810,290, filed Jun. 30, 2022, Young Ha Jung.

* cited by examiner

ASSOCIATING ROUTE TABLES WITH INGRESS TRAFFIC TO LOGICALLY ISOLATED NETWORKS

This application is a continuation of U.S. patent application Ser. No. 16/220,703, filed Dec. 14, 2018, which is hereby incorporated by reference herein its entirety.

BACKGROUND

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each virtual machine being a software simulation acting as a distinct logical computing system that provides users with the illusion that they are the sole operators and administrators of a given hardware computing resource, which also provides application isolation and security among the various virtual machines. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Virtualization technologies have given rise to provider networks, which offer various services or resources to customers via network connections. As the amount of data, transactions, and other interactions with provider networks increase, so too do the various connection requirements for customers of provider networks. Some customers may wish to take advantage of specifying how network traffic is to be handled within provider networks using logically isolated networks within the provider network. Logically isolated networks may provide a customizable virtual networking environment for virtual computing resources hosted within a logically isolated network, allowing for optimized traffic routing, security, or connections to be established to use the virtual computing resources in the provider network. Thus, techniques that further extend the use of some or all of a logically isolated network are highly desirable.

Figure 1:
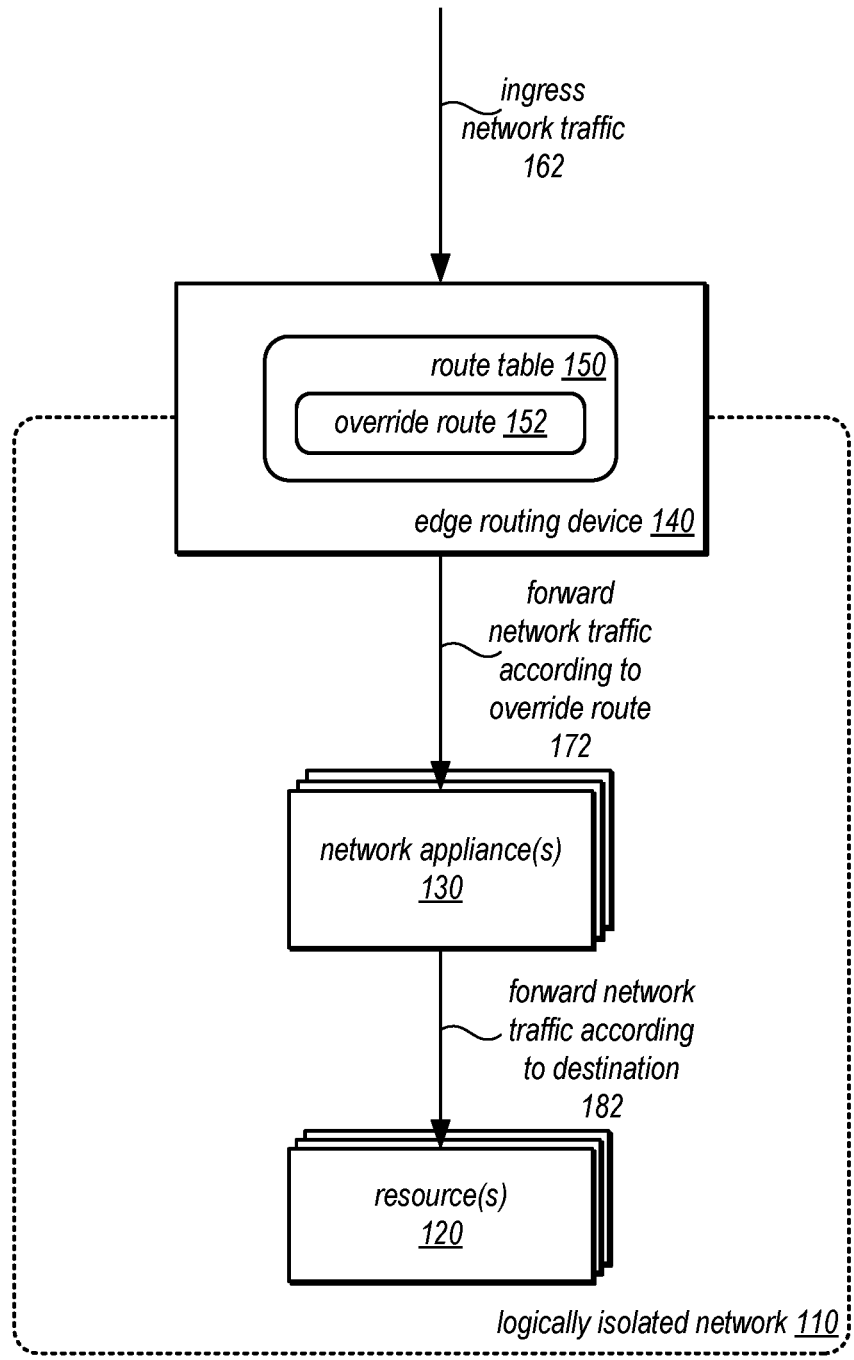
FIG. 1 is a logical block diagram of associating route tables with ingress traffic to logically isolated networks, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of associating route tables with ingress traffic to logically isolated networks are described herein. A provider network or other system or service may implement a network to allow clients, operators, users, or other customers to use, access, operate, or otherwise control one or more computing resources hosted within the network. These resources may include various types of computing systems or devices that can communicate over the network in order to perform various tasks, operations, or services on behalf of the clients. For example, in some embodiments, a provider network may provide virtual computing resources to clients, users, or other type of customers, in the form of reserved compute instances (e.g., a virtual machine acting as a distinct logical computing system that provides users with the illusion that they are the sole operators and administrators of a given hardware computing resource). Customers of the provider network may reserve (e.g., purchase or buy) one or more compute resources (such as compute instances) or utilize other resources to perform various functions, services, techniques, and/or applications.

A provider network may offer client accounts (e.g., customers, users, operators, or other entities) client account-specific security features, in various embodiments. For example, a logically isolated network (which may also be referred to in some environments as a virtual private cloud or VPC) may include a collection of computing and/or other resources in a logically isolated section of the provider network, over which the entity (e.g., user account) using the logically isolated network is granted substantial control with respect to networking configuration. In some embodiments, for example, a customer may select the network address ranges (e.g., Internet Protocol (IP) address ranges or blocks via Classless Inter-Domain Routing (CIDR) notation) to be used for the logically isolated network resources, manage the creation of overlay networks, such as subnets within the logically isolated network, and the configuration of route tables, gateways, etc. for the logically isolated network.

Subnets may offer client accounts of resources hosted in the subnet greater control to route network traffic among resources hosted within the subnet. For example, subnets may allow for the different types of network traffic to be diverted to different resources within the subnet in order to meet quality of service or other performance goals without requiring changes to the operation of substrate networks over or upon which the subnet is implemented, in some embodiments.

Associating route tables with ingress traffic to logically isolated networks may simplify the integration of security and other network appliances within a logically isolated network topology, in some embodiments. For example, network appliances may provide control over the routing path of network traffic and allow users to easily insert a standalone or series of security or other network appliances into the forwarding path of logically isolated network traffic in a prescribed manner. As a result, the capabilities of a logically isolated network can be expanded to include a wide variety of advanced features, such as threat detection, threat prevention, advanced firewall, and more, within the logically isolated network, unlike systems that do not support the association of routing tables with ingress traffic to a logically isolated network. Because network appliances provide service functions such as content filtering, threat detection and prevention, traffic optimization, a common set of network appliances may not supply the features best suited to different applications or systems. By associating route tables with ingress traffic to logically isolated networks, custom network appliances may be added and used within a logically isolated network, either individually or as an ordered sequence of network appliances composing a logical service, (sometimes known as service chains) that are tailored for individual applications in their logically isolated networks.

FIG. 1 is a logical block diagram of associating route tables with ingress traffic to logically isolated networks, according to some embodiments. Logically isolated network 110 may be implemented within a provider network like provider network 200 in FIG. 2 or other system or service that provides logical network isolation for resources hosted on computing systems, servers or nodes (e.g., computer system 1000 in FIG. 8). Resource(s) 120 may be applications (or components thereof) for various storage, data processing, virtual computing, or other computing resources. One (or more) network appliance(s) 130 may be implemented to provide various networking features to ingress (and egress) traffic directed to resources 120 in logically isolated network, in some embodiments. For example, network appliance(s) 130 may operate as an individual network appliance or chain of network appliance(s) or as a managed pool of network appliances scaled to satisfy ingress traffic demand upon logically isolated network 110, as discussed below. Edge routing device 140 may be one (or one of multiple) routing devices or virtual routing devices that handle ingress network traffic 162 to logically isolated network 110. For example, edge routing device 140 may encapsulate network packets of network traffic to include a substrate network header to forward the network packets through substrate network device(s) upon which logically isolated network 110 is implemented as an overlay network.

A route table, such as route table 150 may be associated with edge routing device 140 (e.g., as discussed below with regard to FIGS. 3-7), in order to forward network traffic to network appliance(s) 130. The forwarding of network traffic may be transparent to the sender of the network traffic, in various embodiments as well as transparent to the recipient.

For example, override route 152 may be implemented to direct the forwarding of network packets at edge routing device 140 to network appliance(s) 130 according to override route 152 without modifying the destination field of network packets. For example, override route 152 may specify that the substrate network header that is to encapsulate the network packet to include a substrate network address for the network appliance(s) 130 instead of a substrate network address for resource(s) 120. Edge routing device 140 may forward the network traffic 172 according to the override route 172 to network appliance(s) 130 (e.g., by forwarding encapsulated network packets to the network address of network appliance(s) 130 as specified in the encapsulation), which may perform various network appliance features or techniques (as discussed above) and then forward the traffic again 182 to the destination at resource(s) 120 (e.g., if the ingress traffic is not dropped or diverted depending upon the processing of the network traffic at network appliance(s) 130).

Please note that previous descriptions are not intended to be limiting, but are merely provided as an example of route tables, edge routing devices, network appliance(s), resource(s), and logically isolated networks. The number or arrangement of components may be implemented in many different ways.

This specification next includes a general description of a provider network, which may implement associating route tables with ingress traffic to logically isolated networks. Then various examples of a provider network are discussed, including different components/modules, or arrangements of components/module that may be employed as part of associating route tables with ingress traffic to logically isolated networks. A number of different methods and techniques to implement associating route tables with ingress traffic to logically isolated networks are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
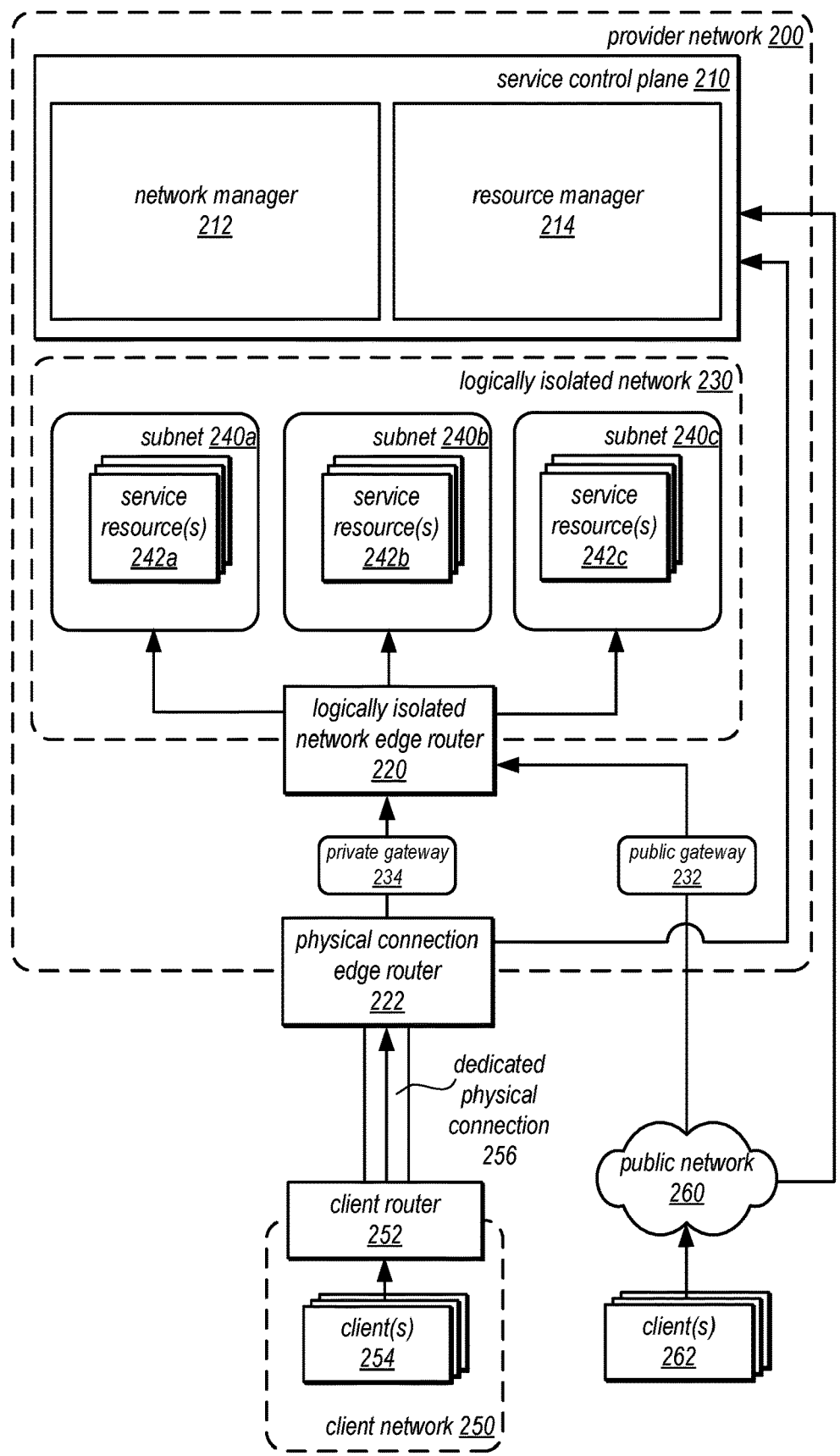
FIG. 2 is a logical block diagram of a provider network that implements associating route tables with ingress traffic to logically isolated networks of a provider network, according to some embodiments.

FIG. 2 is a logical block diagram of a provider network that implements associating route tables with ingress traffic to logically isolated networks of a provider network, according to some embodiments. Provider network 200 may offer various computing resources to clients, such as various types of data analysis, processing, and storage. Computationally intensive applications or systems may utilize multiple distributed computing resources in provider network 200 to provide scalable solutions for a variety of different computing applications. Provider network 200 may be may be set up by an entity such as a company or a public sector organization to provide one or more network-based services (such as various types of cloud-based computing or storage) accessible to clients (e.g., internal clients operating within provider network using provider network resources, or external clients, such as clients 262 via a public network 260 (e.g., the Internet), or clients 254 via a dedicated physical connection 256.

Provider network 200 may include numerous data centers hosting various resource pools, such as collections of physical and/or virtualized computer servers, storage devices, networking equipment and the like, needed to implement and distribute the infrastructure and services offered by the provider network 200. In at least some embodiments, provider network 200 may implement multiple fault tolerant zones, which may isolate failures to a particular zone such that a failure in or of one fault tolerant zone may not cause or trigger a failure in another fault tolerant zone (allowing computing resources in the other fault tolerant zone to continue operating in the event of a failure of another fault tolerant zone). Different data centers, isolated power or computing infrastructures, and/or other provider network architectures may be implemented to provide multiple fault tolerant zones (sometimes referred to as availability zones). While grouped together in FIG. 2, different resources for a client network, such as resource(s) 242a, 242b, or 242c, may be distributed across fault tolerant zones (not illustrated), in some embodiments.

Provider network 200 may include the hardware (e.g., modems, routers, switches, load balancers, proxy servers, etc.) and software (e.g., protocol stacks, accounting software, firewall/security software, etc.) necessary to establish networking links between different components of provider network 200 as well as external networks (e.g., the Internet) or client networks with dedicated physical connections. In some embodiments, provider network 200 may employ an Internet Protocol (IP) tunneling technology to provide an overlay network via which encapsulated packets may be passed through the provider network 200 using tunnels (which may be a substrate network upon which other networks, like logically isolated network 230 and overlay networks, like subnets 240, may be implemented).

Like provider network 200, a client network 250 may offer or provide various applications or services to users of the client network 250, utilizing resources such as client devices 252. For example, client network 250 may be one or more internal networks for one (or multiple) companies, enterprises or organizations. In some embodiments, client network 250 may provide publicly available services, which may be accessible via a public network like the Internet. As part of providing the respective services or functions, client network 250 may utilize various resources offered by provider network 200.

In order to enable connectivity between a client network 250 and multiple resource(s), such as resources 242a, 242b, and 242n, a dedicated physical connection 256 may be implemented. For example, the dedicated physical connection may include one or cables physically linking a pair of co-located routers, one belonging to or managed by the provider network (e.g., physical connection edge router 222) and one belonging to or managed by a client network (e.g., client router 252). However in some embodiments, a third party or entity may operate one or both of physical connection edge router 222 or client router 252. In at least some embodiments, the physical connection edge router 222 and the client router 254 may be located within a co-location facility. However, in other embodiments the two routers may not be located within a same facility or location.

In various embodiments, dedicated physical connection 256 may be utilized to provide a connection and interface to resources 242 in a provider network 200 via a private gateway 234. In at least some embodiments, private gateway 234 may be a physical or virtual network gateway to access logically isolated network 230 according to a private connection, such as dedicated physical connection 256. For example, private gateway 234 may enforce or otherwise implement access controls or security protocols to ensure that the network traffic received through private gateway 234 remains private to the client and destination resource that are communicating. In order to establish a private gateway 234, control request that the private gateway 234 be established over the already established dedicated physical connection 256 can be received. Various parameters may have to be supplied to an administrative component of provider network 200, such as network manager 212, in some embodiments. These parameters may include, for example, one or more of: (a) a VLAN (virtual local area network) identifier or tag that complies with the Ethernet 802.1Q standard, (b) an Internet Protocol (IP) prefix, address range or address, (c) a Border Gateway Protocol (BGP) Autonomous System Number (ASN), or (d) a BGP key. Once established, various systems, components, or devices 254 in client network 250 may communicate with resources 242 through the private gateway 234.

In some embodiments, a VPN connection between a client implemented gateway within a client network 250 (not illustrated) could be established with private gateway 234 to provide a virtual private connection. Such communications could pass over a public network like public network 260, but may utilize private gateway 234 to access resources 240.

Public gateway 232 may provide a physical or virtual gateway that allows communications between resources 242 hosted within logically isolated network 230 and a public network, such as a wide area network like the Internet. For example, a subnet 240 may include a network route that points to public gateway 232 in order to allow traffic to and from resources in the subnet 240 via public network 260, in some embodiments.

Provider network 200 may allow for portions of provider network 200 to be provisioned as a logically isolated network 230 within or portion of provider network 200, in order to allow a customer or user associated with a client account to specify the configuration of the provider network, utilizing features such as specifying a range of network addresses (e.g., via a CIDR block), creation of overlay networks, such as subnets 240a, 240b, and 240c (which may be specified with different CIDR blocks), create and/or manage network route tables and gateways (e.g., like public gateway 232 and private gateway 234) as well as associate route tables for ingress traffic to a logically isolated network, as discussed in detail below. One or more network devices, such as logically isolated network edge router 220, may implement or enforce the specified network configuration, such as handling requests received via private gateway 234 and public gateway 232 according to the parameters or configuration of those gateways, in some embodiments.

Service resources, such as service resources 242a, 242b, 242c, may be resources of one or multiple different services offered by provider network 200 (e.g., virtual compute, data processing, data storage, etc.). Provider network 200 may implement one (or more) of service control plane 210 to manage the various resources 242 offered by provider network 200. Service control plane 210 may be implemented by various collections servers, nodes, computing systems or devices, such as may be generally described below with regard to computing system 1000 in FIG. 8. Service control plane 210 may implement an interface which may be accessible either by client devices 254 over dedicated physical connection 256, or by client devices 262 using public network 260 (which may be associated with client network 250 or linked to common client accounts of the different client networks). The interface may dispatch requests to the appropriate service control plane component(s) to handle the requests such as requests to procure, reserve, enable, disable, configure, or otherwise manage the resources 242 dispatched to resource manager 214 and/or various network management requests sent to network manager 212 to manage logically isolated network 230 and/or subnets 240. For example, the interface may provide the various interfaces described below with regard to FIG. 5. The interface may be programmatic, such as may be implemented by an Application Programming Interface (API), command line interface, and/or a graphical user interface (GUI), in some embodiments.

In at least some embodiments, service control plane 210 may implement various resource management functions as part of resource manager 214. For example, creating/launching and configuring the various resources 242 may be internally managed and performed by resource manager 214. Other control plane function(s) may also be implemented by other management components not illustrated, and may include authenticating client(s) (e.g., associating them with particular client accounts), metering resource usage for different client networks, billing client accounts associated with the client networks, and any other management or control functions to provide the various services of provider network 200.

Service control plane 210 may implement network manager 212, as discussed in more detail below with regard to FIG. 5 to manage logically isolated networks and subnets for resources 242. In some embodiments, network manager 212 may be implemented as a separate service from the resource host service (e.g., utilizing a separate control plane to manage servers, hosts, or other computing devices that manage networks and a separate data plane to store network management information (e.g., routing tables, access rules, etc.). Thus, the previous example architecture is not intended to be limiting.

In various embodiments, clients 254 or 262 may encompass any type of client that can utilize, manage, operate or configure connections or resources in provider network 200. For example, a client may implement various tools, scripts, or other modules that may be able to configure a respective logically isolated network 230 or overlay network 240. As part of managing the networks, clients 254 or 262 may submit various requests to provider network 200 via an interface for service control plane. In order submit requests to provider network 200, a client may include a suitable version of a web browser, or may include a plug-in module or other type of code module configured to execute as an extension to or within an execution environment provided by a web browser. Alternatively, a client may encompass an application such as a resource/connection management or information client (or user interface thereof) that may make use of provider network 200 to manage various resources and connections. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 262 may be configured to generate network-based services requests according to a Representational State Transfer (REST)-style network-based services architecture, a document- or message-based network-based services architecture, or another suitable network-based services architecture In some embodiments clients 262 may convey requests to provider network 200 via a public network 260, which may be a public connection to provider network 200. In various embodiments, the public network 260 may encompass any suitable combination of networking hardware and protocols necessary to establish network-based communications between clients 262 and provider network 200. For example, a network may generally encompass the various telecommunications networks and service providers that collectively implement the Internet. A network may also include private networks such as local area networks (LANs) or wide area networks (WANs) as well as public or private wireless networks.

Figure 3:
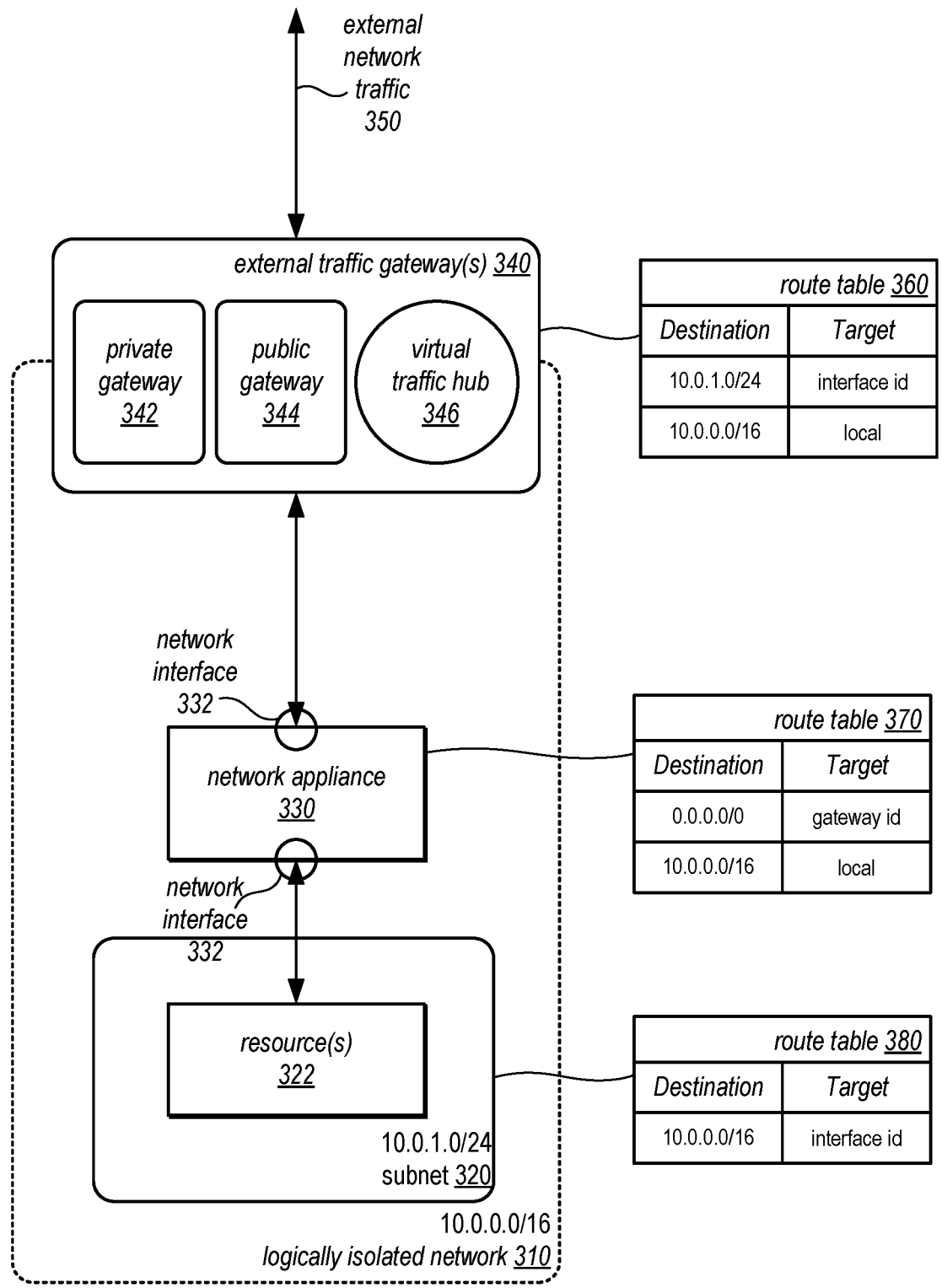
FIG. 3 is logical block diagram illustrating associating route tables with external ingress traffic to logically isolated networks, according to some embodiments.

FIG. 3 is logical block diagram illustrating associating route tables with external ingress traffic to logically isolated networks, according to some embodiments. Logically isolated network 310 may include a subnet 320 within which is hosted one or more service resources 322. To provide access to logically isolated network 310, one (or more) of various external traffic gateways 340 may be created and associated with logically isolated network 310, such as private gateway 342 (similar to private gateway 234 in FIG. 2), public gateway 344 (similar to public gateway 232 in FIG. 2) or other traffic routing and gateway features, such as virtual traffic hub 346. Virtual traffic hub 346 may connect to multiple logically isolated networks (not illustrated), which may be programmatically attached in a hub-and-spoke configuration to virtual traffic hub 346, in various embodiments, so that the routing/forwarding of network packets from one attached logically isolated network to another is managed by nodes of a virtual traffic hub 346 based on metadata and/or policies provided by the creating/using clients, applications, entities, and/or systems. Virtual traffic hub 346 may also be referred to as a transit gateway in some embodiments.

Logically isolated networks attached to virtual traffic hub 346, such as logically isolated network 310, may allow network configuration settings (e.g., network addresses assigned to resources within a given network, subnet configurations, security settings and the like) to be set independently for the different networks, without having to take other networks' configuration settings into account. For example, a range of isolated network addresses selected for resources within one isolated network may happen to overlap with a range of private network addresses selected for resources within another isolated network in various embodiments, since the two address ranges are selected independently. According to some embodiments, the metadata taken into consideration at virtual traffic hub 346 set up on behalf of a given client to manage traffic flowing between various isolated networks may include multiple route tables provided by the client (and/or route tables generated at the virtual traffic hub 346 based on other input provided by the client, such as forwarding information base (FIB) entries from which route table entries may be derived.) After the appropriate route tables have been associated and populated with entries, traffic may be allowed to start flowing between the isolated networks via virtual traffic hub 346 in various embodiments.

A user may create, launch or provision a network appliance, like network appliance 330 in logically isolated network 310. For example, different types of network appliances may be offered by a service of provider network 200, which may be selectable (e.g., via an interface, such as graphical user interface (GUI) implemented as part of a web console or programmatic interfaces). Network appliance 330 may be selected from the different offered types and deployed on provider network 200 resources for logically isolated network 310. In some embodiments, network appliance 330 may be one of a pool of network appliances managed by network manager 212 to provide a network appliance feature (e.g., filter, firewall, etc.) that is scalable to meet the demand to logically isolated network traffic (and possibly other resources in other logically isolated networks), providing a multi-tenant, traffic management service that dynamically scales by adding or removing network appliances to the pool according to demand. As discussed below, network manager 212 may select or identify which network appliance from the pool of network appliances may be used for logically isolated network (e.g., when a request to add a network appliance to logically isolated network 310 is sent to network manager 212 from a user or on-demand when network traffic is received at the external gateway 340). Therefore, in some embodiments, network appliance 330 may differ for some network packets directed to the same resource 322, subnet 320, and/or logically isolated network 310.

Network appliance 330 may be associated or located within logically isolated network 310 using a network interface 332, in some embodiments, which may be specified according to a network interface id. For example, network interface 332 may be implemented as a virtual network device (e.g., a virtual network interface card (NIC) which can be used as a network endpoint (e.g., a network identifier or address) to which traffic directed to network appliance 330 can be sent and which network manager 212 has configured substrate network devices to forward to the resources implementing network appliance 330 according to the network address or identifier of network interface 332.

To route traffic through network appliance 330 (both ingress and egress), a route table 360 may be associated with an external traffic gateway 340. Route table 360 may be specified using one or more requests (e.g., discussed below in FIG. 5) to include a route for traffic with a destination of subnet 320 (e.g., specified by CIDR 10.0.1.0/24) to be targeted to and thus forwarded to network appliance 330, by including in the route the identifier for network interface 332 to override the destination. When ingress network traffic is received at a routing device for the associated external traffic gateway 340, the override route may be applied to the destination specified in the substrate network by encapsulating the network packet with the substrate network address of network appliance 330 (instead of a substrate network address for host system(s) of computing resource(s) 322).

Route table 370 may also be updated for network appliance 330 to route ingress traffic to subnet 310. For example, route table 370 may specify a route with local traffic in the logically isolated network (e.g., specified by CIDR 10.0.0.0/16) to the appropriate local address (e.g., the network address of resource 322 within subnet 310). For egress traffic (e.g., destination 0.0.0.0/0, the gateway identifier of external gateway 340 may be specified). Route table 380 may be updated for subnet 320 to route egress traffic back through network appliance 330. For example, egress traffic (e.g., 10.0.0.0/16) may be directed to the network interface 332 by the interface id.

In some embodiments, different subnets may be implemented in different fault tolerant zones within the same logically isolated network, such as logically isolated network 310. Therefore, a separate route and network appliance (configured as illustrated in FIG. 3) may be implemented in some embodiments in order to route network packets directed to resources in different fault tolerant zones through the network appliance implemented in the corresponding fault tolerant zone.

Although not illustrated in FIG. 3, a chain of network appliances 330 can be implemented between a gateway for a logically isolated network and resource 322 and subnet 320. For example, instead of pointing the local traffic to the subnet 320 in route table 370, local traffic may be pointed to a network identifier of a network interface for another network appliance, which can in turn direct local traffic to subnet 320 in a route table or to another network appliance in the chain.

Figure 4:
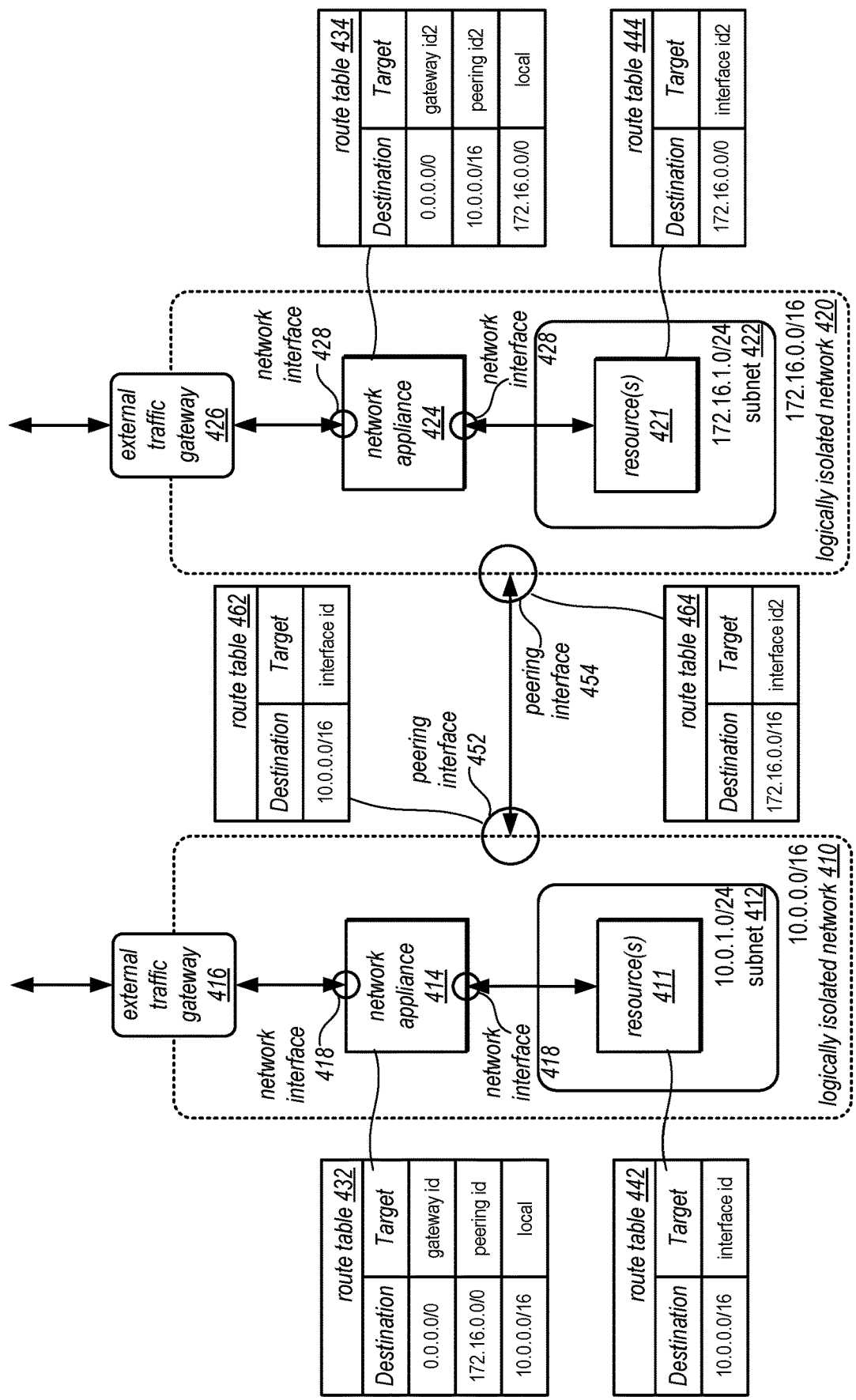
FIG. 4 is logical block diagram illustrating associating route tables with peer network ingress traffic to logically isolated networks, according to some embodiments.

As discussed above with regard to FIG. 1, other sources of traffic external to a logically isolated network may be hosted within a provider network, such as traffic received via a peer connection with another logically isolated network. FIG. 4 is logical block diagram illustrating associating route tables with peer network ingress traffic to logically isolated networks, according to some embodiments. Two logically isolated networks, 410 and 420, may be connected, utilizing peering interfaces 452 and 454 at each logically isolated network to send and receive network traffic to resources, like resources 411 and 421, in the peered network. Logically isolated networks 410 and 420 may implement resources 411 and 421 hosted in respective subnets 412 and 422. Similarly respective external traffic gateways 416 and 426 may be set up to route traffic through respective network appliances 414 and 424 via interfaces 418 and 428 according to the techniques discussed above with regard to FIG. 3.

Route tables, such as 462 and 464 may be associated with an interface to a peered network connection, like peering interfaces 452 and 454, to provide override routes to direct traffic to the network appliance in the other logically isolated network. Similar to network interface 332 discussed above with regard to FIG. 3, peering interfaces 452 and 454 may be implemented as a virtual network device (e.g., a virtual network interface card (NIC) which can be used as a network endpoint (e.g., a network identifier or address) to which traffic directed to logically isolated network 420 (from logically isolated network 410) can be sent (and vice versa) and which network manager 212 has configured substrate network devices to forward to the resources implementing logically isolated networks 410 and 420 according to the network address or identifier of peering interfaces 452 and 454.

For example, route table 462 may route incoming traffic (e.g., 10.0.0.0/16) to identifier of network interface 418 for network appliance 414. Similarly, route table 464 may route incoming traffic via peering interface 454 (e.g., 172.16.0.0/16) to the identifier for interface 428 of network appliance 424. The route tables for network appliances 432 and 434 may add an additional route to handle traffic from the peering interfaces 452 and 454 (e.g., destination 172.16.0.0/0 to the identifier of peering interface 452 in route table 432 and destination 10.0.0.0/16 to the identifier of peering interface 454 "peering id2" in route table 434). Route tables for the subnets, route table 442 and 444 may be set up similar to those in FIG. 3, which may route traffic to the respective network appliances 414 and 424. Similar to the discussion regarding network appliance 330 above in FIG. 3, network appliances 414 and 424 may be respective ones of pools (or a pool) of network appliances selected for deployment to logically isolated network 410 and 420 or a chain of network appliances implemented in logically isolated networks 410 and 420.

Figure 5:
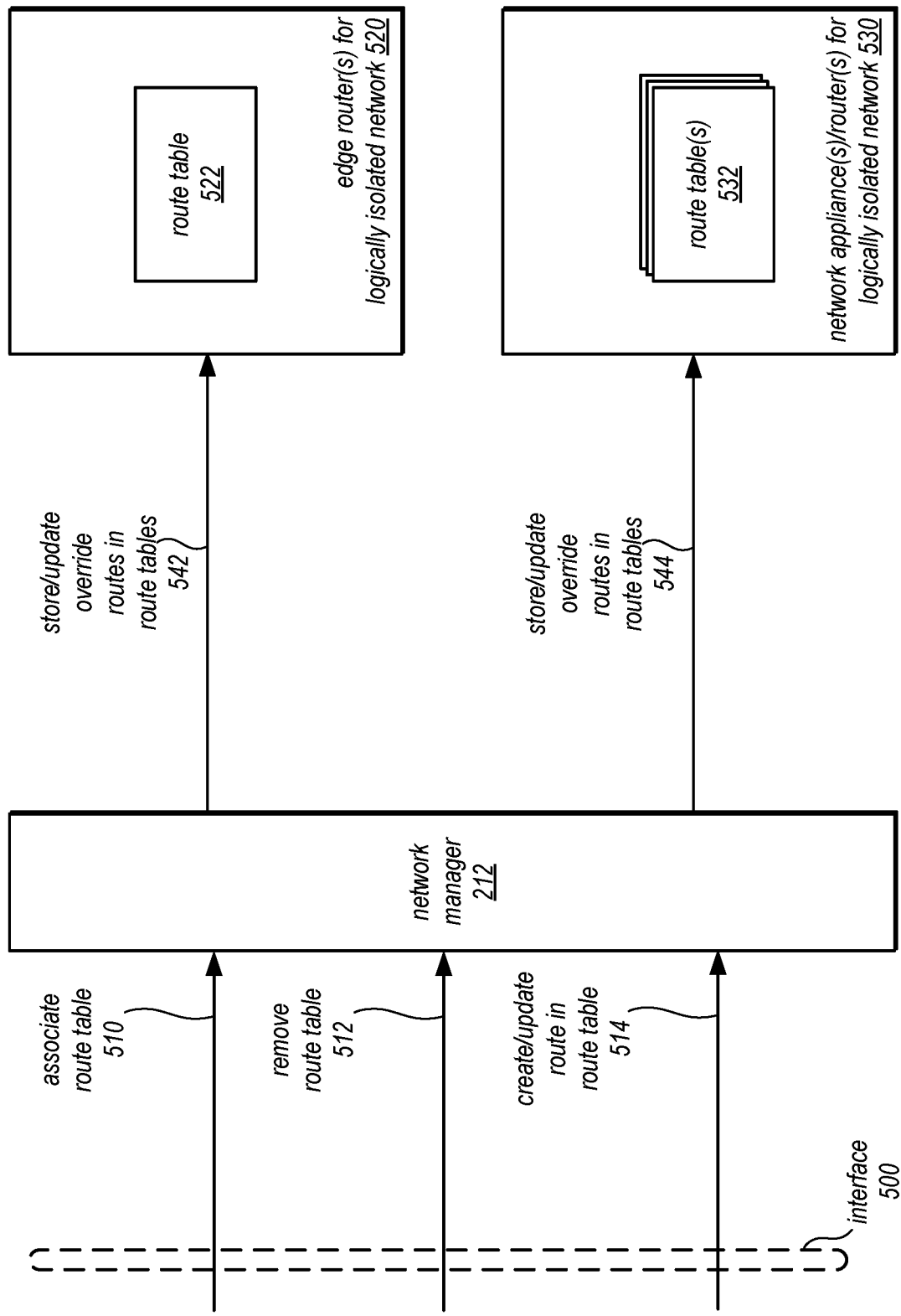
FIG. 5 is logical block diagram illustrating interactions to manage associated route tables with ingress traffic to logically isolated networks, according to some embodiments.

FIG. 5 is logical block diagram illustrating interactions to manage associated route tables with ingress traffic to logically isolated networks, according to some embodiments. Interface 500 may be implemented as part of a control plane or service interface, as discussed above with regard to FIG. 2, in order to allow users of a provider network to perform various operations to configure networking and other resources offered by provider network 200. Interface 500 may be a programmatic interface, which may be accessible via a graphical user interface (GUI) (e.g., implemented as part of a web-based administrator console for a logically isolated network and resources), a command line interface, and/or one or more Application Programming Interfaces (APIs), in some embodiments.

A request to associate a route table 510 may be sent to network manager 212 in order to identify a route table (e.g., by an identifier) that may be associated with various entities or objects within provider network. For example, various created (or to be created) external traffic gateways or connections provided by private network gateways, public network gateways, or virtual traffic hubs, as discussed above with regard to FIG. 3 may be identified (e.g., by an identifier) as a parameter of request 510. In this way, a route table may be associated with ingress traffic received via the gateways or connections identified. Similarly, the associate route table request 510 may be associated with a peer network connection, as discussed above with regard to FIG. 4. Network manager 212 may update control plane data (e.g., a database or other data store that manages, stores, or otherwise maintains routing information including route tables), in some embodiments, responsive to the requests. Network manager 212 may perform the appropriate requests to store or update information in route tables 522 and 532 at edge routers for a logically isolated network 520, which may perform substrate network routing via an encapsulation of network packets received and directed to the logically isolated network and network appliances and/or router(s) for logically isolated network 530 which may perform internal substrate network routing via an encapsulation of network packets received and directed to the logically isolated network and/or applying network features (e.g., traffic shaping, packet inspection, or other network appliance features). For example, as discussed below with regard to FIG. 7, network manager 212 may determine override routes for associating route tables with an edge router 520 and network appliance(s)/routers 530 and store or update 542 and 544 the route tables 522 and/or 532 accordingly, in some embodiments (e.g., by providing a substrate network address for the network appliance to override or otherwise replace the substrate network address of a host system for a computing resource).

As indicated at 512, a request to remove a route table 512 may be received via interface 500 at network manger 212. The request to remove the route table may trigger actions to update the route tables 522 and 532, and may cause the edge routers 520 and network appliance(s)/router(s) 530 to default to remaining routes, in some embodiments. For example, removal of the associated route table may cause an edge router to again route ingress network traffic to the computing resource by encapsulating network packets with a substrate network address for a host system that hosts the computing resource.

As indicated at 514, a request to create or update a route in a route table 514 may be received via interface 500 at network manager 212. Request 514 may identify the network appliance by a network interface identifier, for instance, so that the route may be a route that points to the network interface of the network appliance, as discussed above with regard to FIGS. 3 and 4. As noted above, network manager 212 may perform the appropriate requests to store or update information in route tables 522 and 532 at edge routers for a logically isolated network 520 and network appliances and/or router(s) for logically isolated network 530 which may perform internal routing and/or applying network features, including the determination of override routes.

Figure 6:
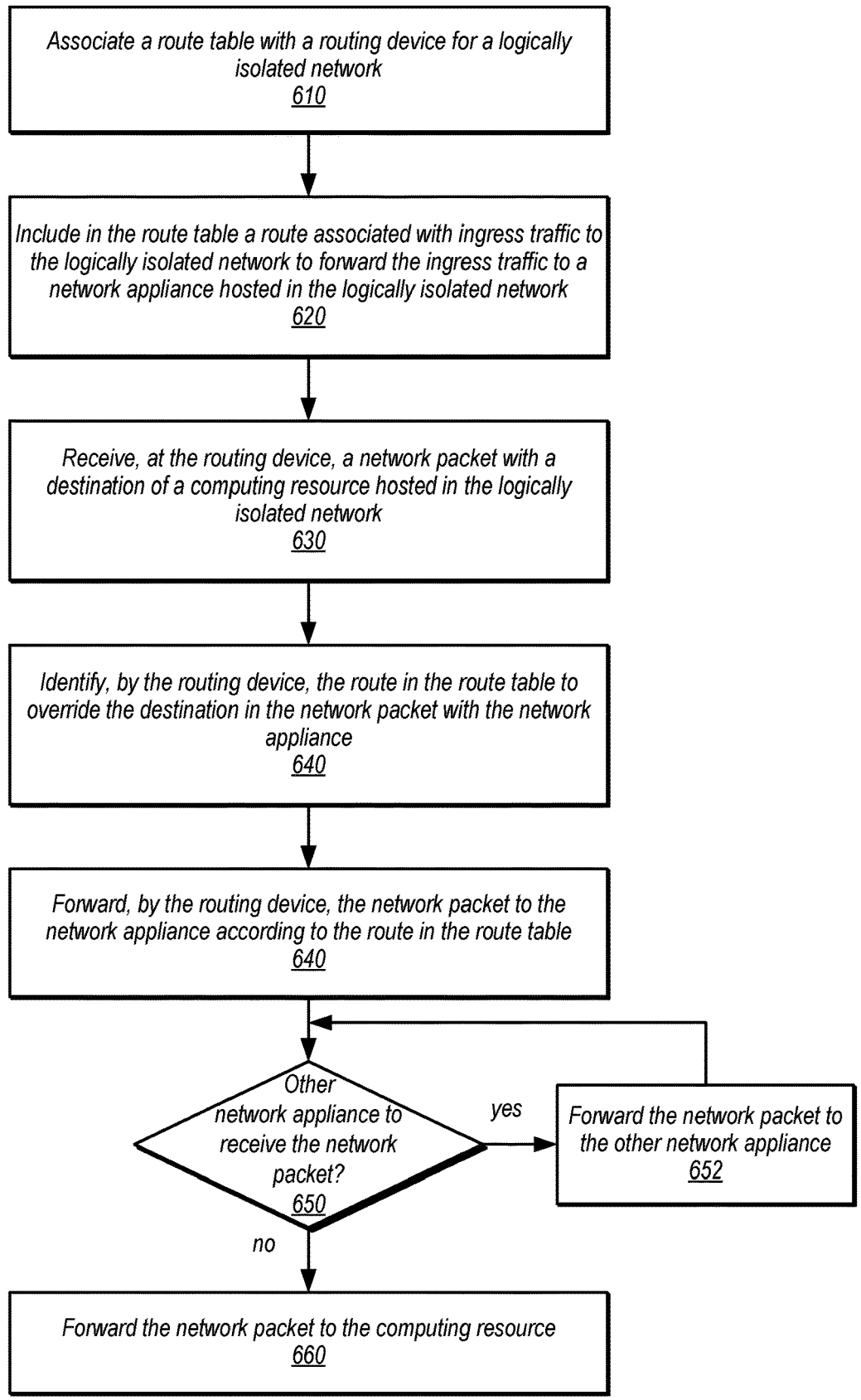
FIG. 6 is a high-level flow chart that illustrates various methods and techniques for associating route tables with ingress traffic to logically isolated networks, according to various embodiments.

The examples of associating route tables with ingress traffic to logically isolated networks of a provider network discussed above with regard to FIGS. 2-5 have been given in regard to a provider network. Various other types or configurations of a system or service that hosts resources in logically isolated networks may implement these techniques. Thus, the components such as those discussed above with regard to FIGS. 2-5 may be differently implemented and still perform associating route tables with ingress traffic to logically isolated networks. FIG. 6 is a high-level flow chart that illustrates various methods and techniques for associating route tables with ingress traffic to logically isolated networks, according to various embodiments. These techniques may be implemented using various components of a provider network as described above with regard to FIGS. 2-5 or other provider network components.

A logically isolated network within a provider network may be created for a client account (e.g., a first client account) of a provider network or other system that offers logical network isolation to users, in some embodiments. A network configuration for the logically isolated network may be established during creation (e.g., access control lists, route tables, DHCP options, DNS settings, network peering connections, public or private network gateways, network endpoints, network auditing or monitoring) and may be later modified.

As indicated at 610, a route table may be associated with a routing device for a logically isolated network, in various embodiments. For example, a router or other networking device that forwards traffic into and out of a logically isolated network can receive traffic from (or implement) an external traffic gateway or peering connection interface as discussed above with regard to FIGS. 3 and 4. A request that identifies the routing device (or the external traffic gateway or peering connection) can be received and the association of the route table be performed in response to the request, in some embodiments. Prior to the association of the route table, a default route or other mapping may be performed at the routing device that was automatically generated for the logically isolated network when it was created (but may have not been explicitly identified or associated with the edge of the logically isolated network by a user in a request).

As indicated at 620, a route may be included in the route table associated with ingress traffic to the logically isolated network to forward the ingress traffic to a network appliance hosted in the logically isolated network, in some embodiments. For example, the route may specify a CIDR for network traffic bound to the computing resource as a destination and include as a target for the ingress traffic, an identifier for a network interface of the network appliance, as illustrated above in FIGS. 3 and 4.

As indicated at 630, a network packet may be received at the edge device with a destination of a computing resource hosted in the logically isolated network, in some embodiments. For example, a network packet may include a network address (e.g., an Internet Protocol (IP) address) of the computing resource.

As indicated at 640, the route in the route table may be identified by the routing device to override the destination in the network packet with the network appliance. For example, a longest prefix match may indicate the next hop address at the routing device is the override route. In other embodiments, a hash table, or other mapping information may be used to perform a look-up at the routing device (and destination resolution if no applicable route is found may be performed by a separate network manager or dropped by the routing device). The mapping information may be updated, as discussed above with regard to FIG. 5 and below with regard to FIG. 7 by a network manager instead of implementing a matching technique at the routing device, in some embodiments.

As indicated at 640, the routing device may forward the network packet to the network appliance according to the route in the route table, in some embodiments. For instance, the network packet may be encapsulated with a substrate network address that identifies the network appliance even though the destination of the network packet still specifies the computing resource. As indicated at 650, other network appliances may also receive the network packet from the first network appliance (e.g., as part of a network appliance chain), in some embodiments. In some embodiments, the chain of network appliances may be selected and deployed in a provider network for a logically isolated network (e.g., from a third party market place for network appliances offered in the provider network or as part of different listings of network appliance chains developed specifically for and offered on the provider network). If the route table for the network appliance directs local traffic to another network identifier for a network interface for another network appliance, then the network packet may be forwarded to the other network appliance, as indicated at 652, in some embodiments. Multiple network appliances may receive the network packet, form various packet processing features and then forward on the network packet (or drop the network packet in some scenarios, such as when directed to by a firewall or other security feature implemented by a network appliance). As indicated at 660, if no other network appliance is to receive the network packet, then the network packet may be forwarded to the computing resource by the latest network appliance to receive the network packet, in some embodiments. For example, the network appliance may change the encapsulation of the network packet to point to a substrate network address for a host of the computing resource so that routing devices that forward traffic according to the substrate network and implementing the logically isolated network may forward the network packet to the host for the computing resource, in some embodiments.

Figure 7:
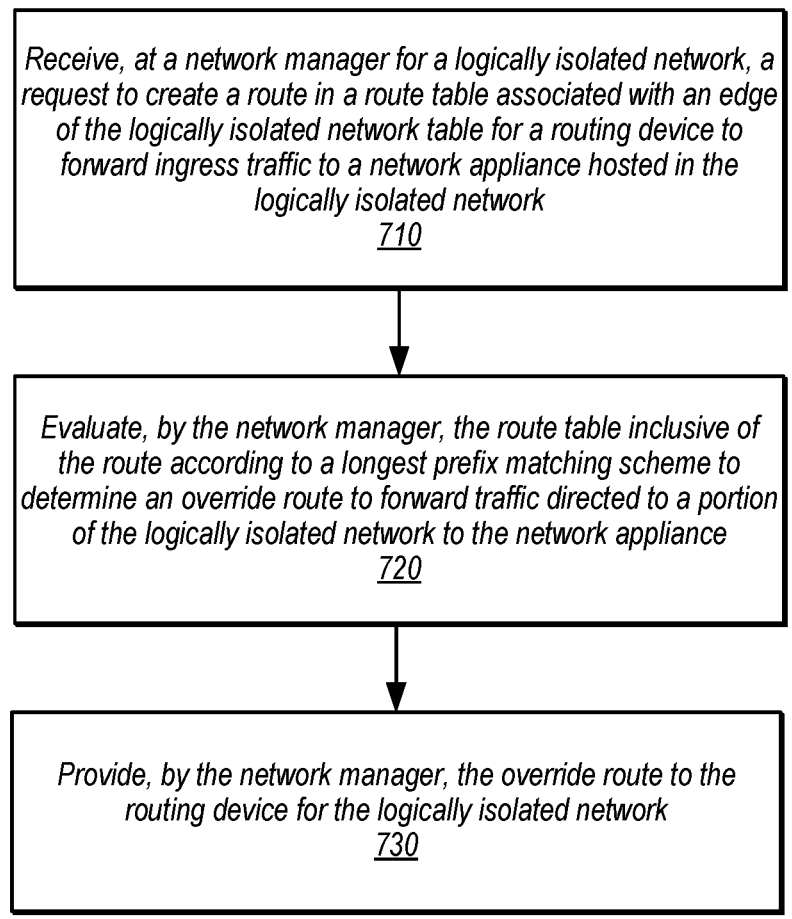
FIG. 7 is a high-level flow chart that illustrates various methods and techniques for determining an override route for an edge routing device, according to various embodiments.

FIG. 7 is a high-level flow chart that illustrates various methods and techniques for determining an override route for an edge routing device, according to various embodiments. As indicated at 710, a request to create a route in a route table associated with an edge of the logically isolated network for a routing device to forward ingress traffic to a network appliance hosted in the logically isolated network may be received at a network manager for the logically isolated network, in some embodiments (e.g., such as request 514 discussed above in FIG. 5)

As indicated at 720, the route table may be evaluated by the network manager inclusive of the route according to a longest prefix matching scheme to determine an override route to forward the traffic directed to a portion of the logically isolated network to the network appliance. For example, the route addition may be evaluated with respect to other routes in the routing table to determine which associated resources may change in their routing due to the length of the route as specified in the request. A route with a longer prefix may cause the mappings of some interfaces, resources, or other objects in the logically isolate network to be shifted or changed if they are a better match to the new route.

As indicated at 730, the override route may be provided to a routing device (or multiple routing devices if multiple routing devices are responsible for the logically isolated network), in some embodiments. The override route may (or may not) be represented in the same format as received in the request. For example, the override route may be specified as a hash table or other mapping scheme entry (or multiple entries), in some embodiments, and may provide a substrate network address to use in encapsulating network packets at the routing devices to be forwarded to the network appliance instead of computing resources hosted within the logically isolated network.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers and other components that implement the router data service described herein). The various methods as illustrated in the figures and described herein represent example embodiments of methods. The order of any method may be changed, and various elements may be added, reordered, combined, omitted, modified, etc.

Figure 8:
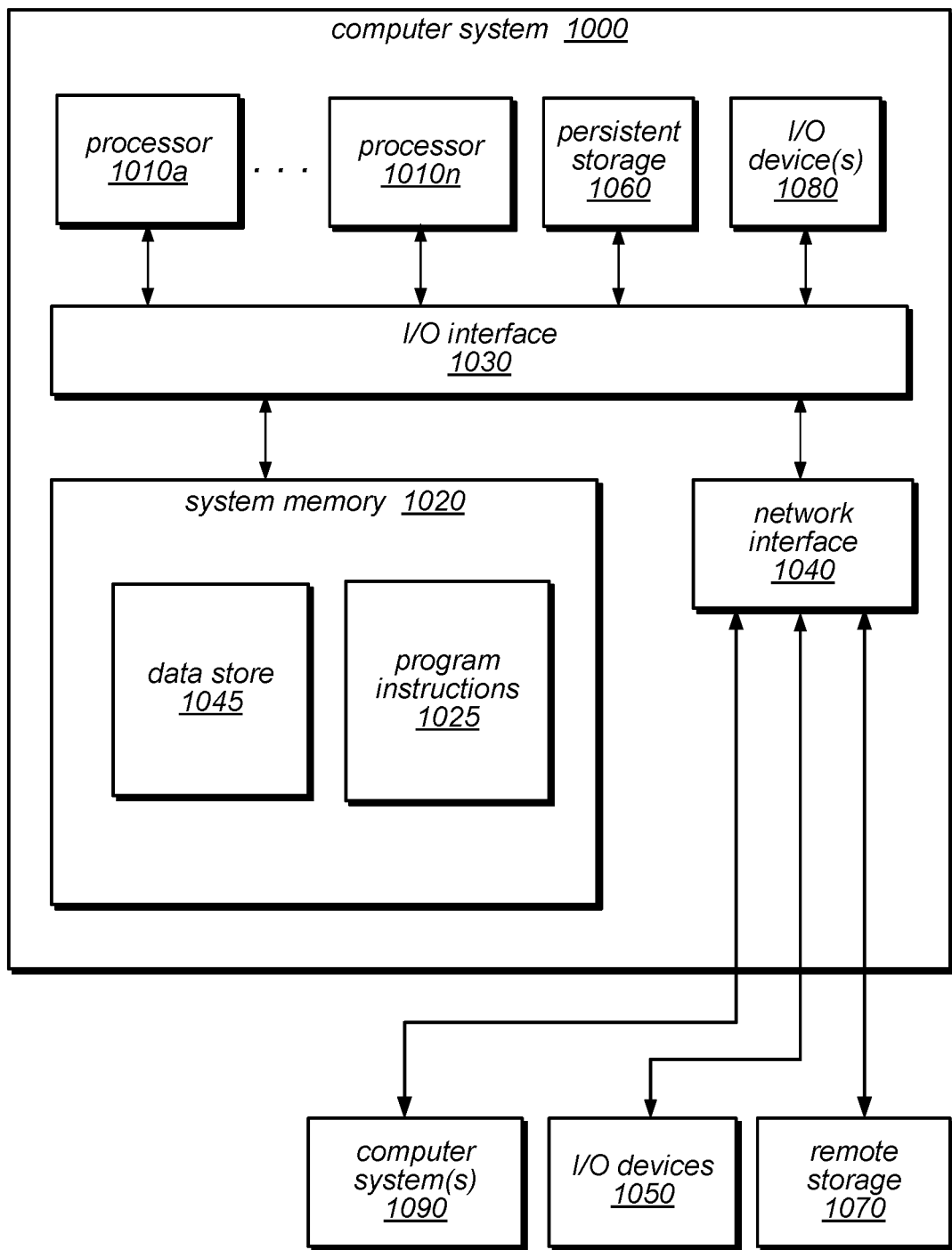
FIG. 8 is a block diagram illustrating an example computing system, according to some embodiments.

Embodiments of associating route tables with ingress traffic to logically isolated networks as described herein may be executed on one or more computer systems, which may interact with various other devices. FIG. 8 is a block diagram illustrating an example computer system, according to various embodiments. For example, computer system 1000 may be configured to implement nodes of a provider network, such as may implement various resources, a control plane, or diagnostic agents, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device, compute node, or computing node.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the system described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a provider network, in different embodiments. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more nodes, endpoints, systems, or services internal to or external to a provider network, and/or clients of the provider network described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 8 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
a plurality of compute nodes, respectively comprising at least one processor and a memory, that implement a provider network, wherein the provider network comprises a virtual traffic hub connected to a first virtual network and a second virtual network, and wherein the second virtual network includes a network appliance;
wherein the provider network is configured to:
receive one or more requests to create a route in a route table for the virtual traffic hub for the virtual traffic hub to forward traffic received at the virtual traffic hub from the first virtual network to the network appliance in the second virtual network; and
include the route in the route table for the virtual traffic hub; and
forward, by the virtual traffic hub according to the route in the route table, the traffic received from the first virtual network to the network appliance in the second virtual network.

2. The system of claim 1, wherein the network appliance is a firewall.

3. The system of claim 2, wherein the traffic is forwarded according to an evaluation of the route table inclusive of the route according to a longest prefix matching scheme to determine the route to forward the traffic.

4. The system of claim 1, wherein the network appliance is one of a plurality of different network appliances selectable via an interface to the provider network by a user associated with the second virtual network to be implemented for the user at the provider network.

5. A method, comprising:
receiving a request to create a route in a route table for a virtual traffic hub to forward traffic received at the virtual traffic hub from a first virtual network of a service to a network appliance in a second virtual network of the service;
including the route in the route table for the virtual traffic hub; and
forwarding, by the virtual traffic hub according to the route in the route table, the traffic from the first virtual network to the network appliance in the second virtual network of the service.

6. The method of claim 5, further comprising:
receiving one or more requests that update the route table for the; and
updating the route table for the virtual traffic hub.

7. The method of claim 5, wherein the network appliance is a firewall.

8. The method of claim 5, wherein the network appliance is one of a plurality of different network appliances selectable via an interface of a provider network by a user associated with the second virtual network to be implemented for the user at the provider network.

9. The method of claim 6, wherein the forwarding comprises evaluating the route table inclusive of the route according to a longest prefix matching scheme to determine the route to forward the traffic to the network appliance.

10. The method of claim 6, wherein the request to create the route includes a network address for the network appliance to point the route to the network appliance.

11. The method of claim 5, wherein the traffic that the route forwards is bound for the Internet.

12. The method of claim 5, wherein the route also forwards traffic received from a third virtual network received at the virtual traffic hub to the network appliance hosted in the second virtual network.

13. The method of claim 5, further comprising:
receiving one or more requests that remove an association between the route table and the virtual traffic hub; and
removing the association between the route table and the virtual traffic hub.

14. One or more non-transitory, computer-readable storage media, storing program instructions that when executed on or across one or more computing devices cause the one or more computing devices to implement:
receiving a request to create a route in a route table for a virtual traffic hub to forward traffic received at the virtual traffic hub from a first virtual network of a service to a network appliance a second virtual network of the service;
including the route in the route table for the virtual traffic hub; and
forwarding, by the virtual traffic hub according to the route in the route table, the traffic received from the first virtual network to the network appliance in the second virtual network.

15. The one or more non-transitory, computer-readable storage media of claim 14, storing further program instructions that when executed on or across the one or more computing devices to further implement:

receiving one or more requests that update the route table for the virtual traffic hub; and updating the route table for the virtual traffic hub.

16. The one or more non-transitory, computer-readable storage media of claim 14, wherein, in forwarding the traffic, the program instructions cause the one or more computing devices to implement evaluating the route table inclusive of the route according to a longest prefix matching scheme to determine the route to forward the traffic to the network appliance.

17. The one or more non-transitory, computer-readable storage media of claim 15, storing further program instructions that when executed on or across the one or more computing devices to further implement:

receiving one or more requests that remove the association between the route table and the virtual traffic hub; and removing the association between the route table and the virtual traffic hub.

18. The one or more non-transitory, computer-readable storage media of claim 15, wherein the traffic that the route forwards is bound for the Internet.

19. The one or more non-transitory, computer-readable storage media of claim 14, wherein the route also forwards traffic received from a third virtual network received at the virtual traffic hub to the network appliance in the second virtual network.

20. The one or more non-transitory, computer-readable storage media of claim 14, wherein the network appliance is one of a plurality of different network appliances selectable via an interface to a provider network by a user associated with the second virtual network to be implemented for the user at the provider network.

* * * * *